UNITED STATES PATENT OFFICE.

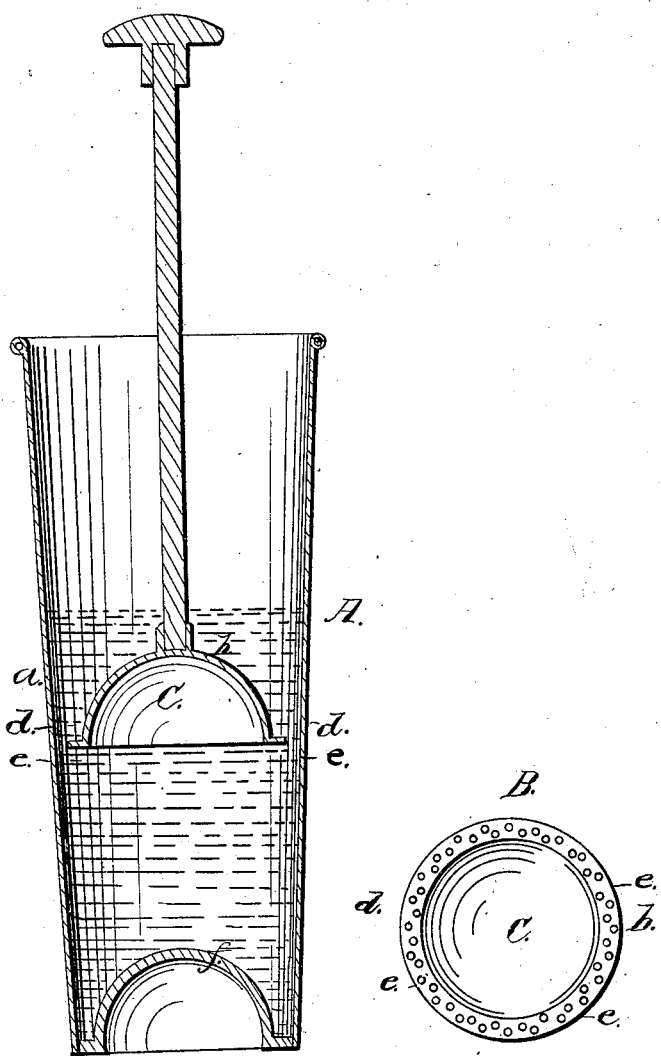

E. L. PRATT, OF BOSTON, MASSACHUSETTS.

IMPROVED APPARATUS FOR AERATING AND MIXING SUBSTANCES.

Specification forming part of Letters Patent No. 59,449, dated November 6, 1866.

*To all whom it may concern:*

Be it known that I, E. L. PRATT, of Boston, in the county of Suffolk and State of Massachusetts, have invented an Improved Aerating Apparatus; and I do hereby declare that the following, taken in connection with the drawings which accompany and form part of this specification, is a description of my invention sufficient to enable those skilled in the art to practice it.

In compounding materials for making bread, cake, pastry, &c., various means are employed for imparting lightness to the productions, such as the use of yeast, ammonia, eggs, &c., and the aeration of the dough thereby, the object of such preparation being to give great porosity to the dough, both to insure the even baking of the whole mass and to bring all the particles of matter into the best cellular condition for the action of the gastric juice of the stomach.

In the employment of leaven or yeast so much time is occupied in bringing the dough to a proper state of fermentation that other ingredients are often used, which, through manipulation of the dough and the action of the heat, immediately communicate the desired lightness or porosity, either in the operation of mixing or by the heat of the oven.

But the use of many of the substances employed for generating carbonic-acid gas is objectionable, and as the main purpose is to fill the mass of dough throughout with air, the object of my invention is to furnish a means by which this may be mechanically effected, with the employment of the simplest and most harmless materials.

To effect this I have designed an apparatus for dividing, aerating, and mixing fluid or semi-fluid substances, employed chiefly in the preparation of dough, by which, at each reciprocation of a plunger, a small body of air is minutely divided, and the divisions or jets forced into the mass contained in the mixing-vessel, and through which the plunger is operated.

It is in an apparatus having this method of operation that the invention consists, and as it is to the mechanical preparation rather than to the chemical action of the compounds or the ingredients thereof, the theory of such chemical action does not require to be herein elucidated.

A, in the drawing, represents a central section of an apparatus embodying my invention. B shows a view of the lower face of the plunger.

$a$ denotes a frusto-conical vessel for containing the fluid or semi-fluid material or materials to be divided, aerated, and intermixed. $b$ is a plunger, having a concavity, $c$, in its lower face, and a flange, $d$, extending outwardly therefrom, and this flange is pierced with numerous small holes, $e$, as seen at B. The bottom of the vessel $a$ is made with a convex surface, $f$, which, when the plunger is carried against it, fits into the recess or concavity, $c$, and the extreme diameter of the plunger or the flange thereof is made to correspond with or so as to fit closely into the vessel $a$ at or near its bottom.

The action of the apparatus is as follows: Eggs or other fluid or semi-fluid matter being introduced into the vessel, and the plunger raised above the same to allow the air to enter the cavity $c$, the plunger is then pressed down through the fluid, dividing and commingling the particles thereof, and as the plunger reaches the convexity $f$ the air is thereby displaced from the cavity $c$, and, escaping through the holes $e$, enters the fluid in minute divisions, and this operation is repeated by reciprocation of the plunger (bringing it at every upward movement above the fluid in order that a fresh supply of air may enter the cavity) until the mass is completely filled or aerated with air-vessels, and the component parts of the liquid or semi-liquid mass are thoroughly commingled.

Instead of having the convex surface $f$, the bottom of the vessel may be made plain, and the air discharged or forced from the cavity by concussion of the plunger against the bottom of the vessel.

The plunger may have a valve in its top, opening by the upward movement of the plunger and allowing the cavity to fill with air, and closing by the pressure of the fluid against the air as the plunger is moved downward.

By making the vessel flaring or frusto-conical the upward movement of the plunger is rendered easy, the fluid rushing down at the sides as the plunger rises.

The apparatus, thus constructed and used, will be found of great assistance in culinary operations, as it furnishes a ready means of beating up eggs, and of aerating other semi-fluids to be used in preparing dough or paste for bread, cake, or pastry, to render the production light, spongy, or cellular, and free from objectionable alkalies and salts.

I claim—

1. The apparatus for aerating fluid or semi-fluid substances, having a construction and mode of operation substantially as set forth.

2. The process of aerating fluid or semi-fluid substances by carrying air in a body into the body of the liquid and there discharging it in minute or finely-divided jets or particles, substantially as set forth.

E. L. PRATT.

Witnesses:
J. B. CROSBY,
FRANCIS GOULD.